Patented Nov. 10, 1925.

1,561,158

UNITED STATES PATENT OFFICE.

WILLIAM P. M. GRELCK, OF ST. PAUL, MINNESOTA.

SEMISOLID STOCK FOOD AND PROCESS FOR MAKING THE SAME.

No Drawing.    Application filed September 27, 1923.    Serial No. 665,226.

*To all whom it may concern:*

Be it known that I, WILLIAM P. M. GRELCK, a citizen of the United States, residing at St. Paul, in the county of Ramsey and State of Minnesota, have invented new and useful Improvements in a Semisolid Stock Food and Process for Making the Same, of which the following is a specification.

It is the object of this invention to provide a semi-solid grain food in which substantially all of the nutritious constituents of the cheaper and coarser portions of the grain are retained in digestible form.

A further object is to produce the preservative agent in a semi-solid grain food from the grain itself.

The process of the present invention is an improvement upon that described and claimed in my co-pending application for patent on self preserving stock food and process for making the same, filed July 20, 1923, Ser. No. 652,852. In the process of the prior application, the preservative agent namely, lactic acid, was generated in milk whey, whereas in the present process it is generated in a liquor made from the grain itself. I have discovered, as a part of this invention, that a preservative quantity of lactic acid may be produced from sugar (such as maltose or malt sugar) developed from malt grain and starch, and that the starch may be obtained by properly treating whole grain or the starchy part thereof.

In carrying out my process, it is to be understood that the kinds of grain used may be varied without departing from the spirit of my invention. Under present conditions, I find that an excellent product may be obtained at a minimum cost by utilizing grain of the following kind and in the stated proportions.

I first take 100 lbs. of barley (about 60% of which is starchy matter) crush it, and add 500 lbs. of water. The mixture is brought to about 200 degrees Fahrenheit to reduce the starchy portion or endosperm of the grain to a soluble state so that it may be acted upon by the diastase in the malt grain which is later incorporated with the barley mash. The temperature of the mixed water and barley is now reduced to about 150 degrees Fahrenheit by the addition of about 200 lbs. of water. About 20 lbs. of malt grain is now added, the malt having been previously crushed. A temperature of from 150 to 160 degrees Fahrenheit is maintained until substantially all of the starch from the barley has been converted by the action of the diastase into malt sugar or maltose. A suitable test for starch is the well known iodine test; the presence of starch being indicated by a blue color which disappears when the conversion is complete. The time required for this conversion is from 2 to 4 hours and the liquor or wort produced contains approximately 7½ per cent maltose. The temperature of the barley mash is reduced to about 150 degrees before adding the malt because the diastase in the latter is rendered at least partially inactive by heat applied at higher temperatures.

From the whole mash of about 820 lbs., 700 lbs. of the maltose liquor (obtained by allowing the solid constituents to settle) is now drawn off and diluted by the addition of about 1400 lbs. of water so that the mash will contain from 2 to 3 per cent maltose. A lactic acid bacilli starter is next added to the maltose liquor. While maintaining the liquor at about 100 degrees Fahrenheit, fermentation is allowed to progress for from 3 to 5 days, this period being sufficient to allow the bacilli to generate to the fullest, possible extent. The liquor will now contain approximately 2 per cent of lactic acid.

About 200 lbs. of the liquor prepared as described above, containing 2 per cent of lactic acid, is now utilized to soften and reduce 60 lbs. of shorts to easily digestible form. The shorts which are composed of about 28 per cent of the whole wheat berry, being the outer portion thereof, are steeped in the liquor for from 12 to 16 hrs. when it is ground to a creamy paste. The solid constituents of the barley mash, consisting of about 40% of the whole barley, together with the remainder of the 20 lbs. of malt, is now ground fine to render said constituents easily digestible and is then mixed with the paste made from the shorts. To the paste thus produced, a preservative quantity of lactic acid is now added.

Seven hundred pounds of the two per cent lactic acid liquor prepared as described above is incorporated with the paste and the whole mash is pasteurized by heating to about 140 degrees Fahrenheit for from 30 to 60 minutes to destroy pathogenic bacteria. The water in the mass is then evaporated in a partial vacuum until the product contains from 30 to 40 per cent of solid matter, and about six per cent of lactic acid. When so evaporated, I have 300 pounds of my finished product. I prefer to eliminate the water at a temperature of about 140 degrees Fahrenheit in a partial vacuum because substantially higher temperatures destroy the natural color of the product as well as some of the valuable constituents of the grain. The product is finally placed in air tight barrels or other containers in which it may be stored or transported for use.

The lactic acid inhibits fermentation in the containers so that the product is self preserving and is itself valuable as a food on account of its high activating qualities. Steeping the grain in the lactic acid solution facilitates the grinding and assists in reducing the valuable constituents of the coarse, fibrous grain hulls to digestible form. The steeping makes it possible to grind the solid constituents to a much finer state than would be otherwise possible.

It will be evident that out of a total of 2100 lbs. of lactic acid liquor prepared as above described, I use only 900 lbs. for the treatment of the grain and to supply the necessary lactic acid for preservation of the 300 pounds of finished product herein before specified. The liquor being two per cent lactic acid, contains 18 lbs. of the acid so that in the concentrated finished product six per cent of the acid is obtained. The remaining 1200 lbs. of the sour liquor is available for further production of my improved stock food.

As an alternate method of obtaining starch for conversion into malt sugar, I proceed as follows: 100 lbs. of barley is first crushed and 50 to 65 per cent of the whole grain, being the endosperm or starchy part thereof, is separated from the courser constituents by the well known process of bolting. The starchy part of the grain is now mixed with about ten times its weight of water and brought to about 200 degrees Fahrenheit to make the starch soluble. Approximately 20 lbs. of malt is next added, and while maintaining the temperature at from 150 to 160 degrees Fahrenheit, the starch is converted into malt sugar, as described above. The remaining steps of the process are similar to the preferred procedure described above except that the courser constituents of the barley are incorporated with the shorts or other grain and are steeped and ground with the latter. It is considered that brewers' grain, a by product of the malt beverage manufacturer, where available, is an excellent substitute for shorts in my improved process.

Having described my invention what I claim as new and desire to protect by Letters Patent is:

1. The process of preparing a grain food which consists in adding water to the starchy part of a quantity of whole grain and heating the same to render the said constituents soluble, then adding a quantity of malt grain and steeping to produce maltose, subsequently converting the maltose into lactic acid, and adding a quantity of grain.

2. The process of preparing a grain food which consists in adding starch to a quantity of malt grain and steeping to produce maltose, subsequently converting the maltose into lactic acid and then adding a quantity of grain hulls and grinding the mass.

3. The process of preparing a grain food which consists in crushing a quantity of whole grain and heating the same in water to about 200 degrees Fahrenheit to render the starchy constituents soluble, then adding a quantity of malt grain and steeping to produce maltose, subsequently converting the maltose into lactic acid and adding an additional quantity of grain and steeping and grinding the grain, and finally eliminating a substantial amount of the water present.

4. The process of preparing a selfpreserving food product which comprises, preparing a wort containing malt sugar, then converting a substantial amount of said malt sugar into lactic acid, and subsequently incorporating with the liquor so produced a quantity of ground grain.

5. The process of preparing a selfpreserving food product which comprises, preparing a wort containing malt sugar, then converting a substantial amount of said malt sugar into lactic acid, subsequently incorporating with the liquor so produced a quantity of grain, and finally eliminating the water present until the product contains from 30 to 40 per cent solid matter, and from 3 to 6 per cent of lactic acid.

6. The process of preparing a selfpreserving food product which comprises, preparing a wort containing from six to ten per cent of malt sugar, then converting a substantial amount of said malt sugar into lactic acid, and subsequently incorporating with the liquor so produced a quantity of ground grain hulls.

7. The process of preparing a selfpreserving food product which comprises, converting malt sugar in a quantity of wort into lactic acid, subsequently steeping grain hulls in the liquor so produced and finally evaporating a substantial amount of the water present.

8. The process of preparing a selfpreserving food product which comprises, converting maltose in a quantity of wort to lactic acid, subsequently incorporating ground grain hulls with the liquor so produced, then pasteurizing the mash so produced, and finally eliminating a substantial amount of the water present.

9. The process of preparing a selfpreserving food product which comprises converting malt sugar in a quantity of wort to lactic acid, subsequently incorporating ground grain with the liquor so produced, then pasteurizing the mash so produced, and finally evaporating a substantial amount of the water present so that the product contains from 30 to 40 per cent of solid matter.

10. A food product containing ground grain, wort formed from malted grain, and a preservative quantity of lactic acid.

11. A food product containing from 30 to 40 per cent of ground grain, malted grain wort, and from three to six per cent of lactic acid.

12. A self preserving wet food product containing as its principal ingredient ground grain impregnated with a preservative quantity of lactic acid.

In testimony whereof, I have hereunto signed my name to this specification.

WILLIAM P. M. GRELCK.